Feb. 3, 1925.

G. M. KEMP

GRAIN SCOURER

Filed Oct. 31, 1924

1,525,398

INVENTOR.
George M. Kemp,
BY
Geo. P. Kimmel, ATTORNEY.

Patented Feb. 3, 1925.

1,525,398

UNITED STATES PATENT OFFICE.

GEORGE M. KEMP, OF WILLIAMSPORT, MARYLAND.

GRAIN SCOURER.

Application filed October 31, 1924. Serial No. 747,026.

*To all whom it may concern:*

Be it known that I, GEORGE MILLIARD KEMP, a citizen of the United States, residing at Williamsport, in the county of Washington and State of Maryland, have invented certain new and useful Improvements in Grain Scourers, of which the following is a specification.

The invention relates to a rotary grain scourer and has for its object to provide, in a manner as hereinafter set forth, a scourer of the class referred to with means to retard the grain during its passage to form an attrition action between the grain for not only facilitating the scouring operation, but further to provide for the thorough cleaning of the grain without breaking the same.

Further objects of the invention are to provide, in a manner as hereinafter set forth, a rotary grain scourer, which is comparatively simple in its construction and arrangement, strong, durable, readily knocked down and assembled when occasion requires, thoroughly efficient in its use, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1:
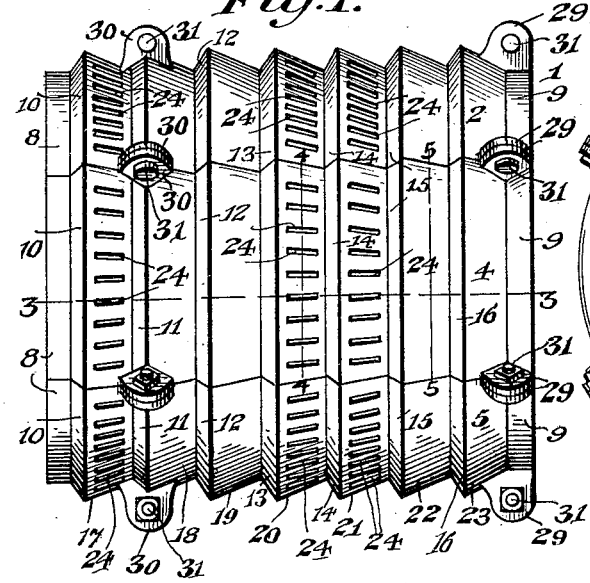
Figure 1 is a side elevation of a grain scourer, in accordance with this invention.
Figure 2:
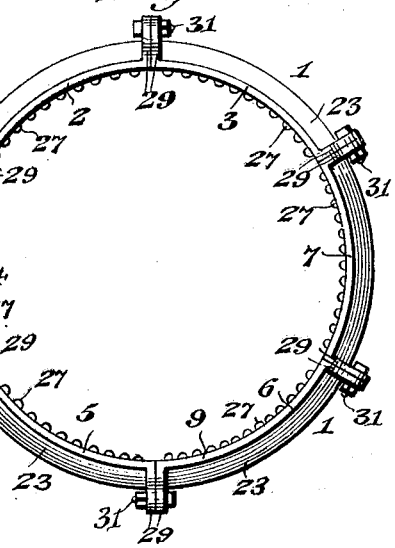
Figure 2 is an end view thereof.
Figure 3:
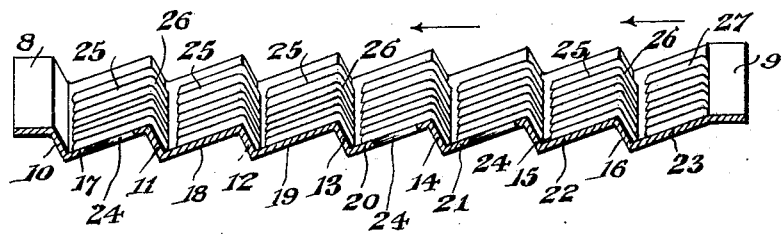
Figure 3 is a section on line 3—3, Figure 1, through one of the sections of the cylinder.
Figure 5:
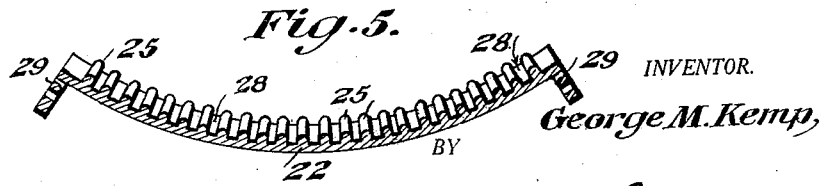

Figure 5 is a section on line 5—5, Figure 1, through one of the sections of the cylinder, Referring to the drawings in detail, the scourer comprises a revolvable cylinder formed of a series of complemental segment-shaped stepped sections detachably connected together and as shown the cylinder, which is referred to generally by the reference character 1, is set up of six sections, indicated at 2, 3, 4, 5, 6 and 7.

As each of the sections of the cylinder 1 is of the same construction but one will be described, as the description of one will apply to the others. Each of the sections consists of a length of suitable material segmental in cross section and formed with a flange 8 at one end and a flange 9 at the other end. Between the flanges 8 and 9 the remaining portion of the section includes a series of outwardly extending inclined portions 10, 11, 12, 13, 14, 15 and 16, and a series of inwardly extending inclined portions 17, 18, 19, 20, 21, 22 and 23, whereby that part of the section between the flanges 8 and 9 will be stepped or zig-zag. The inwardly extending inclined portion 17 extends from the outer side of the portion 10 to the inner side of the portion 11. The portion 18 extends from the outer side of the portion 11 to the inner side of the portion 12. The portion 19 extends from the outer side of the portion 12 to the inner side of the portion 13. The portion 20 extends from the outer side of the portion 13 to the inner side of the portion 14. The portion 21 extends from the outer side of the portion 14 to the inner side of the portion 15. The portion 22 extends from the outer side of the portion 15 to the inner side of the portion 16. The portion 23 extends from the outer side of the portion 16 to the inner side of the flange 9. The portion 10 extends from the inner side of the flange 8 to the outer side of the portion 17. The portions 10 to 16 both inclusive incline towards the outer sides of the portions 17 to 23, both inclusive.

The flanges 8 and 9, portions 10 to 16 both inclusive, and portions 18, 19, 22 and 23 are imperforate. The portions 17, 20 and 21 are formed with a series of transversely extending slots 24 for the passage of the chaff or other matter scoured from the grain.

Figure 4:
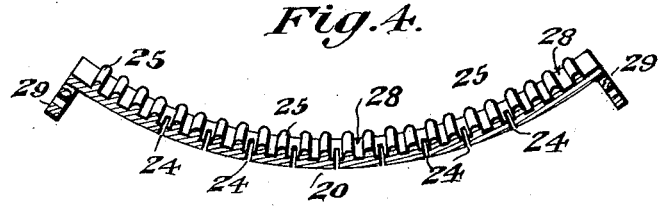
Figure 4 is a section on line 4—4, Figure 1, through one of the sections of the cylinder.

The portions 10 to 16 inclusive, in connection with the portions 17 to 23 inclusive, provide the section with a series of L-shaped parts over which the grain travels and which will agitate the grain during the travel thereof, and each of the portions 17 to 22 both inclusive, has its inner face formed with transversely extending ribs or teeth 25 and with the outer tooth or rib at each end of the series spaced a substantial distance from an end of each of said portions 17 to 22. Each of the portions 11 to 16 is formed with a series of spaced ribs or teeth 26 which merge and form a continuation of the teeth formed on the portions 17 to 22. The portion 23 has its inner face provided with a series of transversely extending spaced ribs or teeth 27 which terminate at a point removed from the teeth on the portion 16 and extend to the inner side of the flange 9. The teeth or ribs of each series are so disposed with respect to each other as to provide pockets, and these latter are generally referred to by the reference character 28, Figures 4 and 5. The angle-shaped or L-shaped parts of the section, in connection with the teeth and pockets 28 act to retard the passage of the grain throughout the cylinder and not only cause an attrition action between the grain, but also facilitates the scouring operation and further provide for the thorough cleansing of the grain without breaking the same.

Each of the sections, at one end, has extended from its outer periphery, a pair of apertured lugs 29, and these latter are formed integral with the portion 23 and flange 9. Each of the sections is furthermore provided, at a point removed from its other end, with a pair of spaced apertured lugs 30 and each of said lugs 30 is formed integral with the portions 11 and 18. The lugs 29 of one section, as well as the lugs 30, oppose the lugs 29 and 30 of a pair of adjacent sections, and the opposed lugs are detachably connected together by hold-fast devices 31, whereby when the sections are connected together the cylinder 1 is provided. When the sections are connected together the flanges 8, as well as the flange 9, form an annular collar or band, and which are arranged at opposite ends of the cylinder. The direction of travel of the grain is indicated by the arrows.

A scourer, in accordance with this invention, thoroughly cleanses the grain without breaking it, and owing to the construction of the cylinder an attrition action is set up between the grain which facilitates the scouring thereof, and although the preferred embodiment of the invention is as illustrated and described, yet changes in the details of construction can be had which will fall within the scope of the invention as claimed.

What I claim is:—

1. A grain scourer comprising a cylinder provided with a series of integral L-shaped parts, each of said parts having its inner face provided with transversely extending spaced teeth forming pockets, certain of said parts provided with slots opening into the pockets of said parts.

2. A grain scourer comprising a cylinder provided between its ends with outwardly extending inclined portions and inwardly extending inclined portions, said inwardly extending portions of greater length than said outwardly extending portions and connecting these latter together, spaced teeth integral with the inner face of said inwardly extending portions and with certain of said outwardly extending portions, said teeth providing pockets extending transversely of said portions.

3. A grain scourer comprising a cylinder provided between its ends with outwardly extending inclined portions and inwardly extending inclined portions, said inwardly extending portions of greater length than said outwardly extending portions and connecting these latter together, spaced teeth integral with the inner face of said inwardly extending portions and with certain of said outwardly extending portions, said teeth providing pockets extending transversely of said portions, and certain of said inwardly extending portions provided with discharge slots opening into certain of said pockets.

4. A grain scourer comprising a hollow cylindrical body portion formed of a series of detachable segmental sections, each of said sections having stepped parts between the ends thereof and spaced teeth on the inner face of said parts, certain of said teeth extending in an opposite direction with respect to the remainder of the teeth, and certain of said parts provided with discharge slots extending lengthwise of said body portion.

In testimony whereof, I affix my signature hereto.

GEORGE M. KEMP.